United States Patent
Wong

(10) Patent No.: US 7,136,514 B1
(45) Date of Patent: Nov. 14, 2006

(54) METHOD FOR AUTHENTICATING AN INDIVIDUAL BY USE OF FINGERPRINT DATA

(76) Inventor: Jacob Y. Wong, 7110 Georgetown Rd., Goleta, CA (US) 93117

( * ) Notice: Subject to any disclaimer, the term of this patent is extended or adjusted under 35 U.S.C. 154(b) by 695 days.

(21) Appl. No.: 10/373,887

(22) Filed: Feb. 25, 2003

Related U.S. Application Data

(63) Continuation-in-part of application No. 10/102,667, filed on Mar. 22, 2002, now Pat. No. 7,013,030, which is a continuation-in-part of application No. 10/074,011, filed on Feb. 14, 2002.

(51) Int. Cl.
*G06K 9/00* (2006.01)
(52) U.S. Cl. .......................... 382/124; 340/5.83; 902/3
(58) Field of Classification Search ...................... None
See application file for complete search history.

(56) References Cited

U.S. PATENT DOCUMENTS

| | | | | | |
|---|---|---|---|---|---|
| 5,363,453 | A | * | 11/1994 | Gagne et al. | 382/125 |
| 5,982,913 | A | * | 11/1999 | Brumbley et al. | 382/124 |
| 6,185,317 | B1 | * | 2/2001 | Nakayama | 382/124 |
| 2003/0002719 | A1 | * | 1/2003 | Hamid et al. | 382/124 |
| 2003/0028784 | A1 | * | 2/2003 | Uchida | 713/186 |
| 2003/0161502 | A1 | * | 8/2003 | Morihara et al. | 382/115 |

* cited by examiner

*Primary Examiner*—Samir A. Ahmed
*Assistant Examiner*—Charles Kim

(57) ABSTRACT

A method for authenticating an individual by use of fingerprint data that involves two different broad steps. The first step is to obtain a biometrics fingerprint signature template ("BFST") for an individual in an enrollment process by selecting a plurality of bands for the BFST and obtaining a plurality of tracks corresponding to each of the plurality of bands by use of an enrollment frame of a selected finger of the individual, wherein the plurality of bands are spatially referenced to the enrollment frame and can be spatially referenced to a reference barrier. The second step is to authenticate (or not) a candidate finger against one or more BFST in an authentication process in which a swipe direction and an access code for the individual are selected, a plurality of candidate tracks are obtained from the candidate finger through use of the reference barrier in an authentication unit so that each of the plurality of candidate tracks is spatially referenced so as to be within a corresponding one of the plurality of bands, calculating a similarity index for each of the plurality of candidate tracks and each of the plurality of tracks for the band to which the candidate track corresponds by use of a Fast Fourier-transform fingerprint algorithm, and multiplying each maximum similarity index obtained for each of the plurality of candidate tracks to obtain a match index which indicates a match if it exceeds a preselected threshold.

84 Claims, 11 Drawing Sheets

Full fingerprint assimilated by FAFA software into 10 bands of equal bandwidth and band separation. Each band comprises 21 tracks with uniform track separation equal to ~0.075 mm.

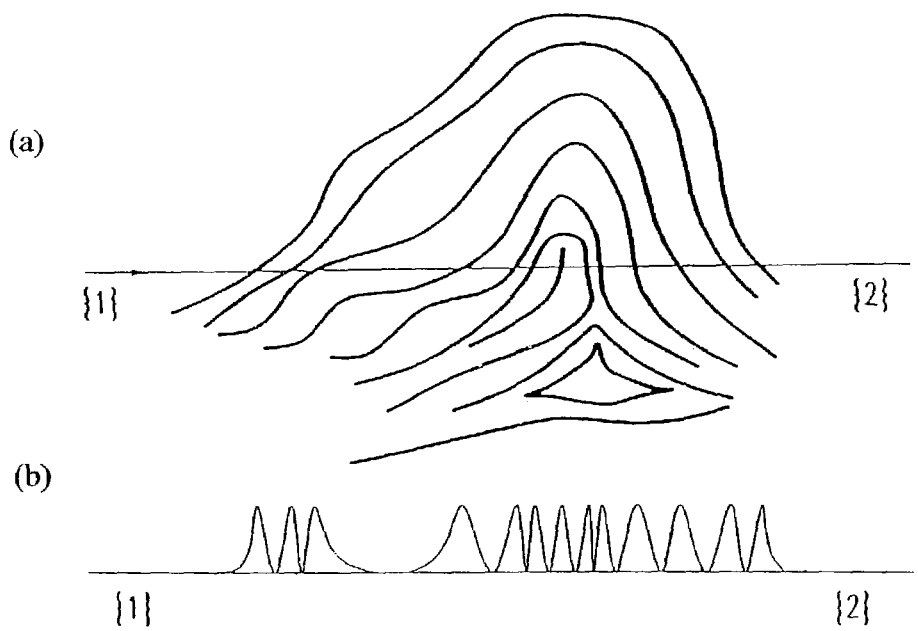
Figure 1a.  A horizontal or West-East straight line ridge-valley contour across a fingerprint called "Linear signature".
Figure 1b.  Same "Linear Signature" shown in Figure 1a displayed as a detector output of an optical-source/detector setup.

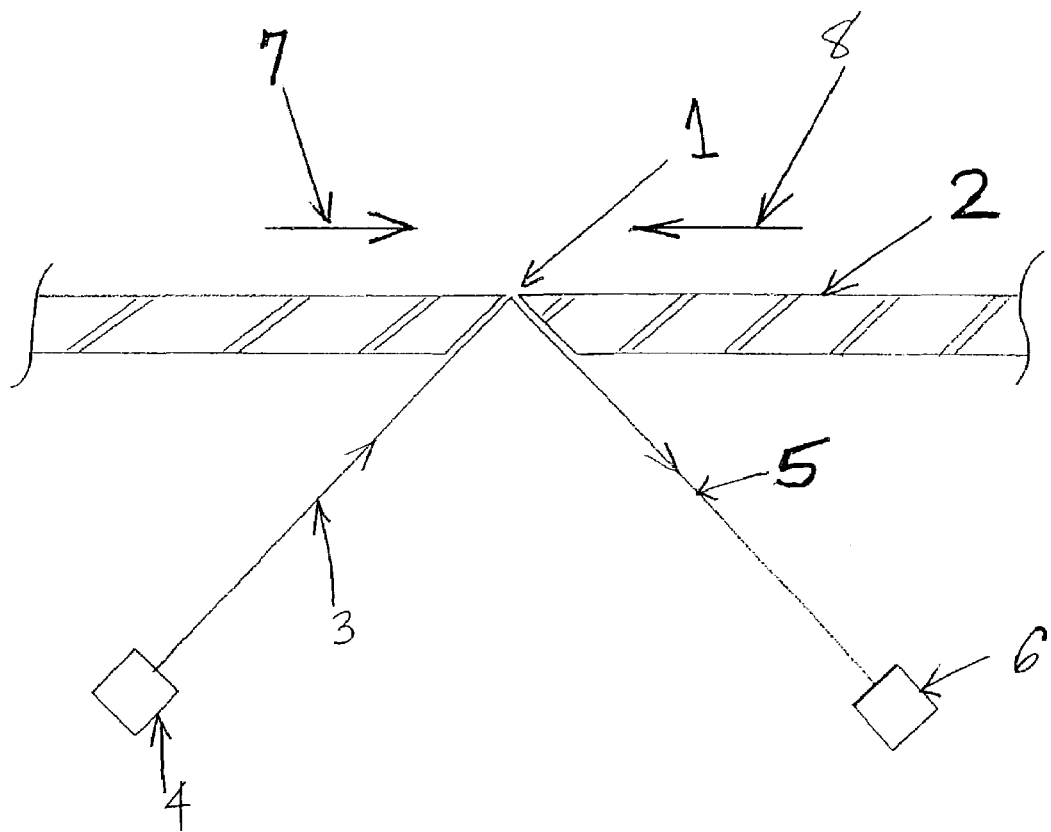
Figure 2. Optical light-source/detector setup for generating linear Signatures as shown in Figure 1b.

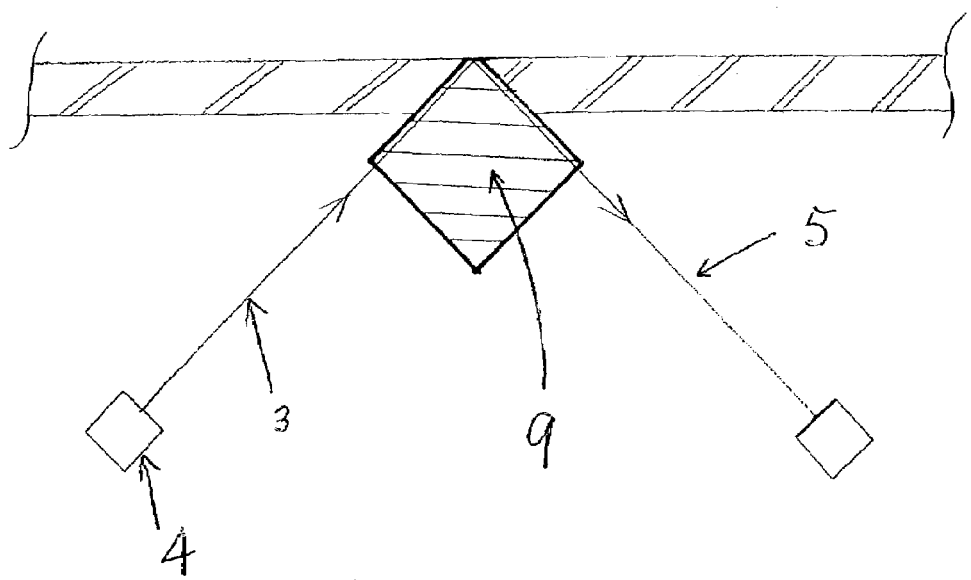
Figure 3. Optical light-source/detector setup utilizing a total internal reflection technique for generating linear signatures shown in Figure 1b for obtaining better signal-to-noise ratio or optical contrast.

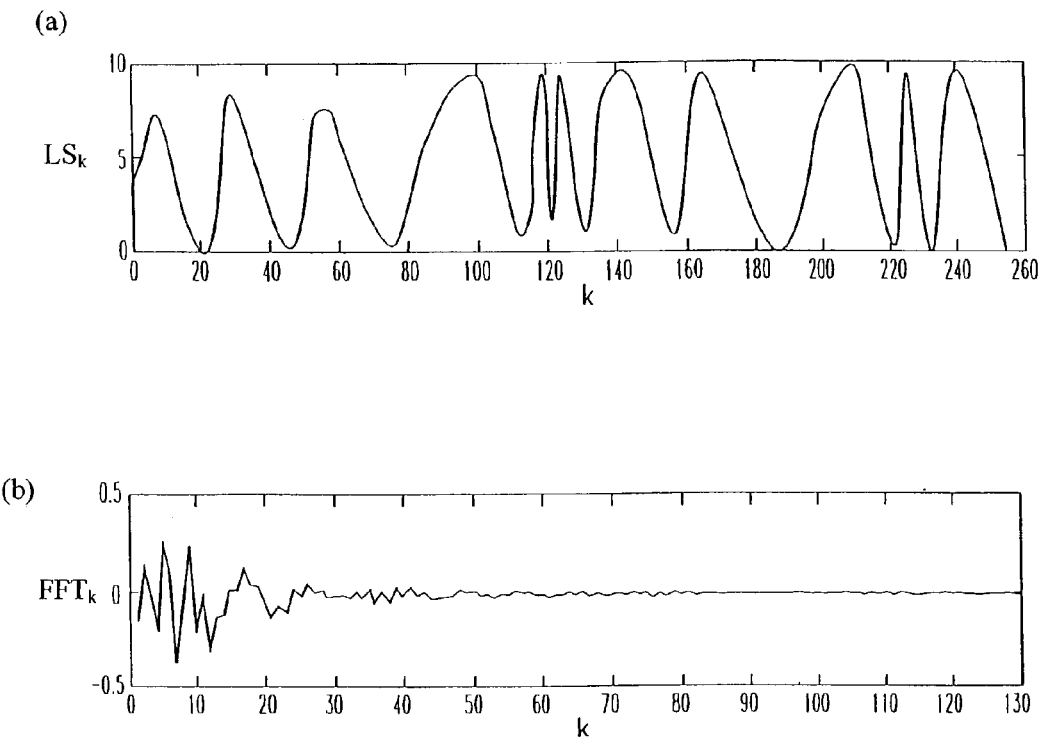
Figure 4a. A linear signature as shown in Figure 1b digitally formatted into a "track" having 256 pixels.
Figure 4b. The real part of the Fast Fourier Transform ($FFT_k$) corresponding to the linear signature $LS_k$ as shown in Figure 4a.

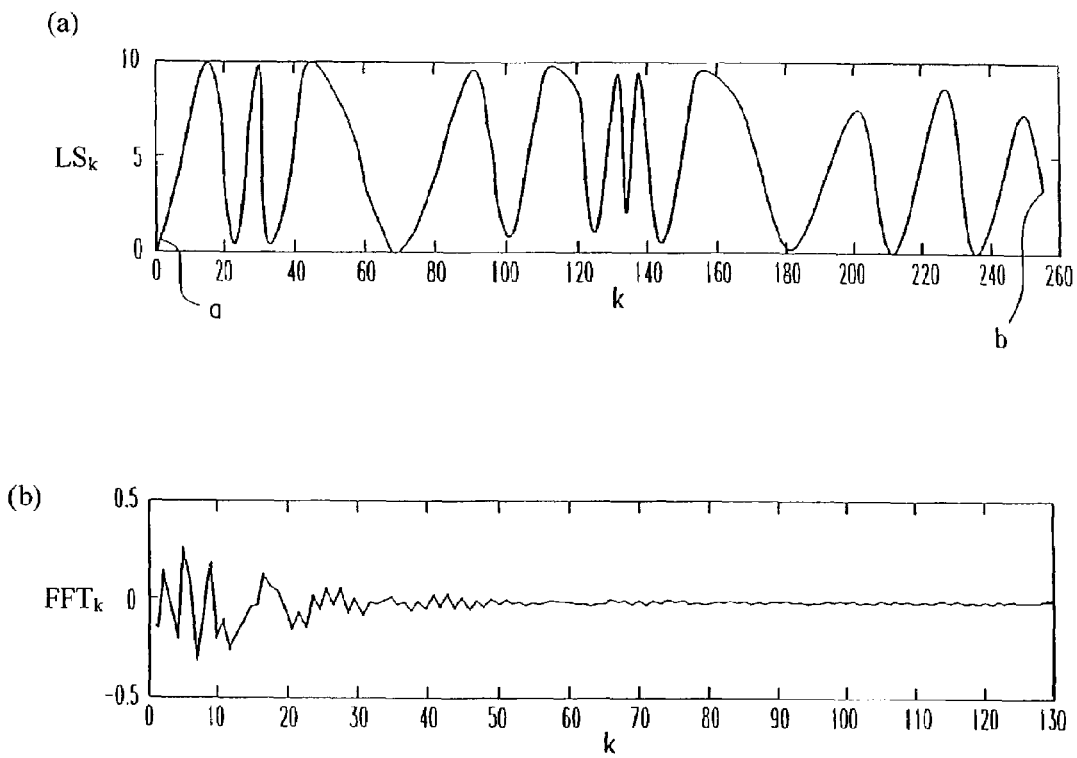
Figure 5a. A reverse linear signature as that shown in Figure 4a.
Figure 5b. The real part of the Fast Fourier Transform ($FFT_k$) corresponding to the reverse linear signature $LS_k$ as shown in Figure 5a.

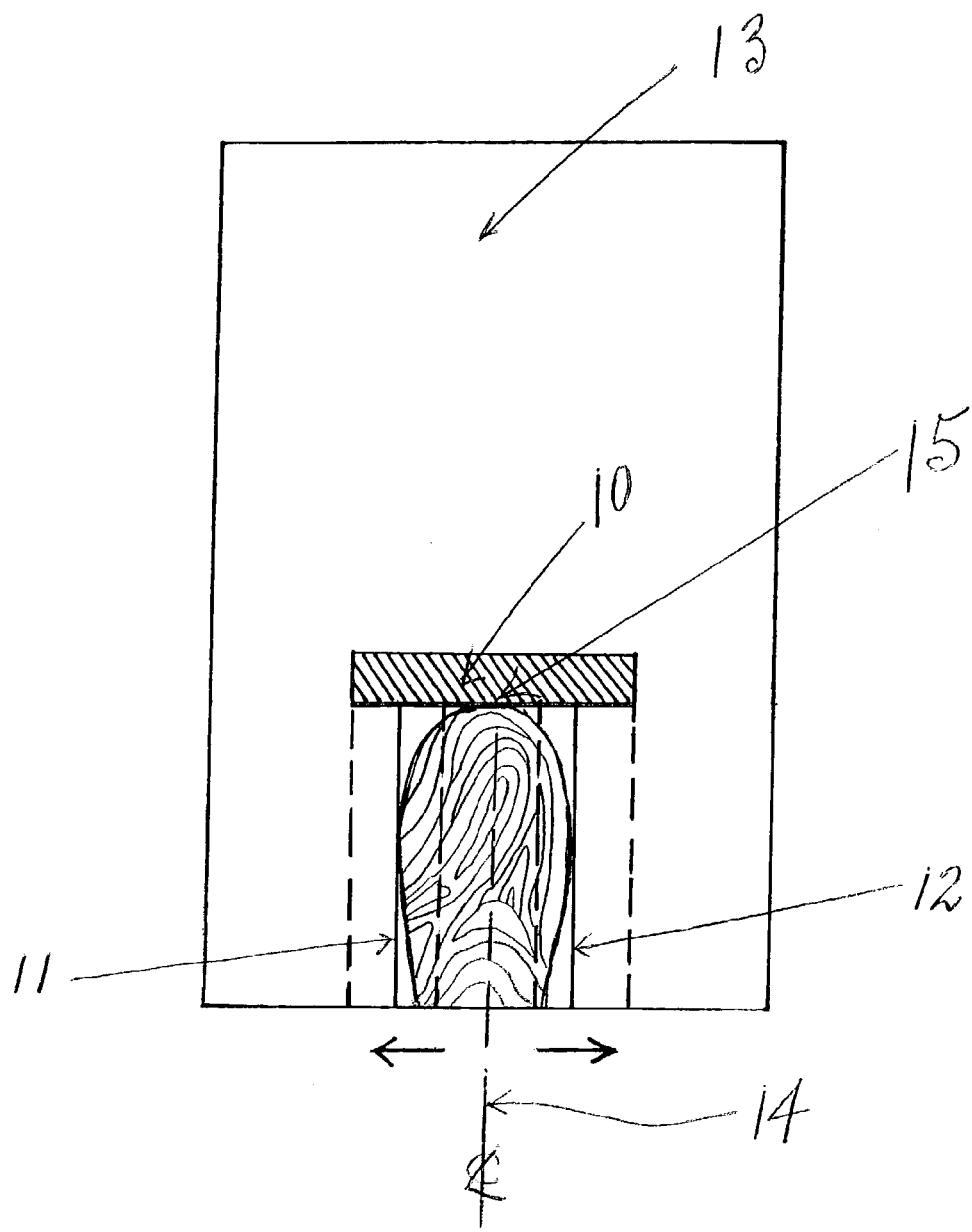
Figure 6. A full fingerprint reader modified by adding an Enrollment Frame defined by a reference barrier at the top and two tractable side limiters.

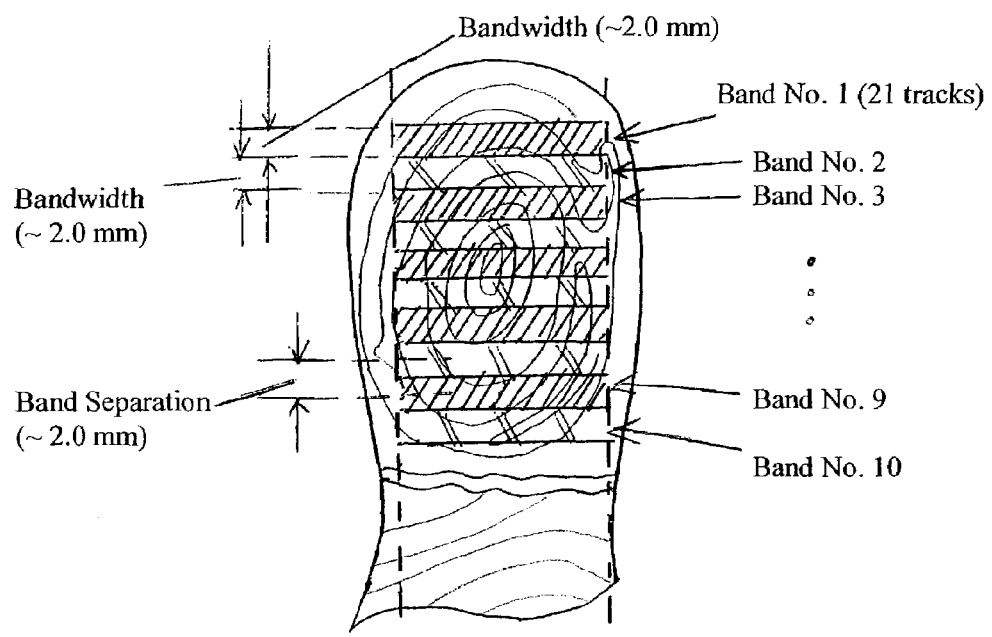
Figure 7. Full fingerprint assimilated by FAFA software into 10 bands of equal bandwidth and band separation. Each band comprises 21 tracks with uniform track separation equal to ~0.075 mm.

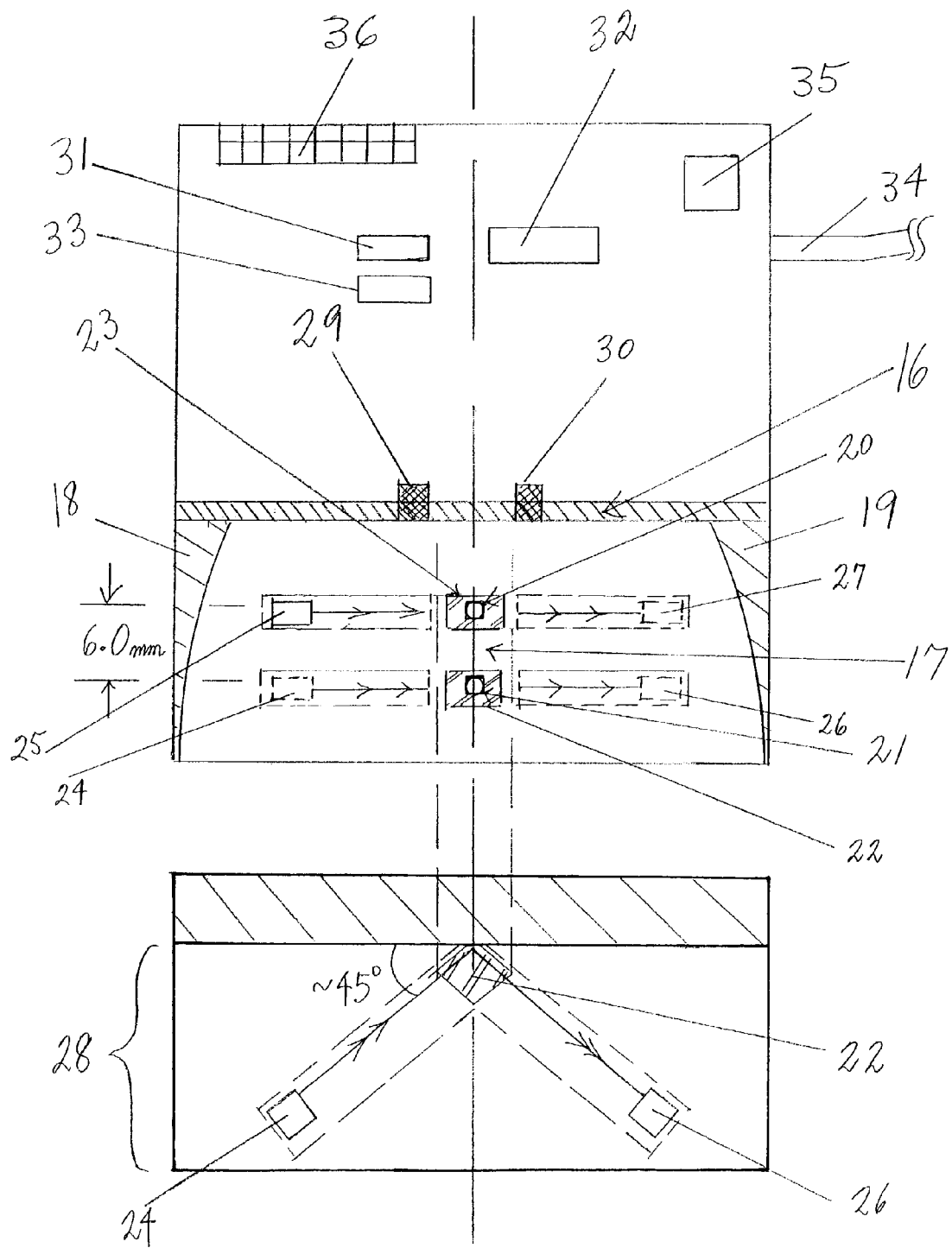
Figure 8. Schematic layout for the Authentication Unit (AU).

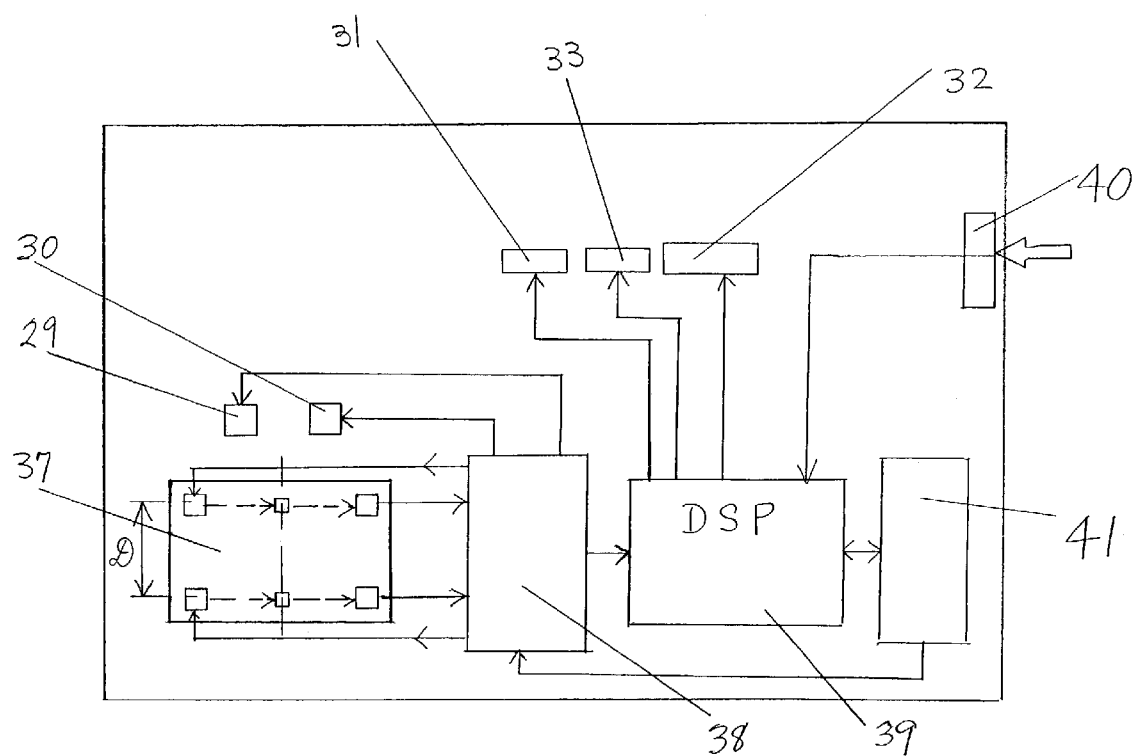
Figure 9. A simplified system block diagram for the Authentication Unit signal processor.

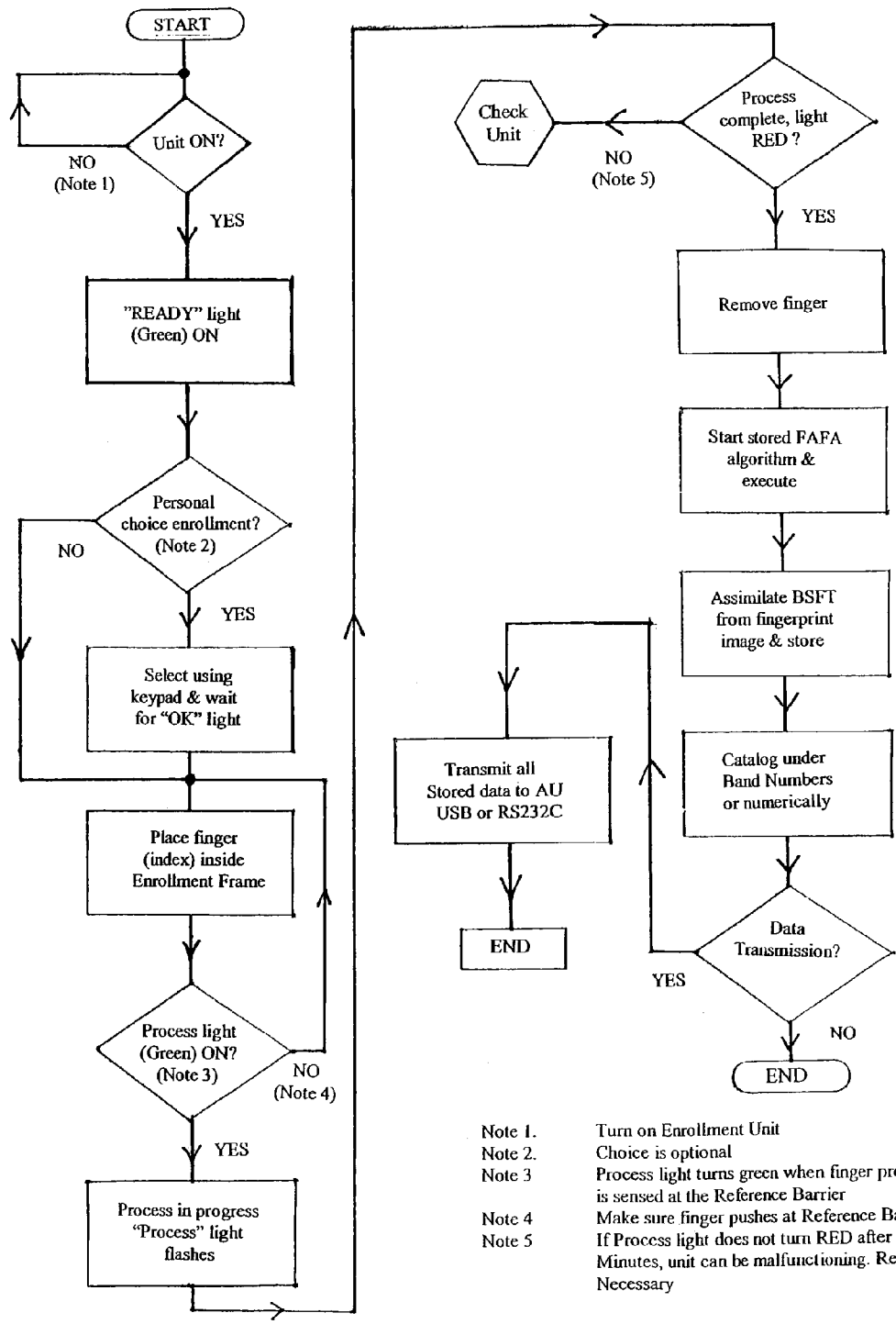
Figure 10. Flowchart for FAFA Enrollment Process at Enrollment Unit

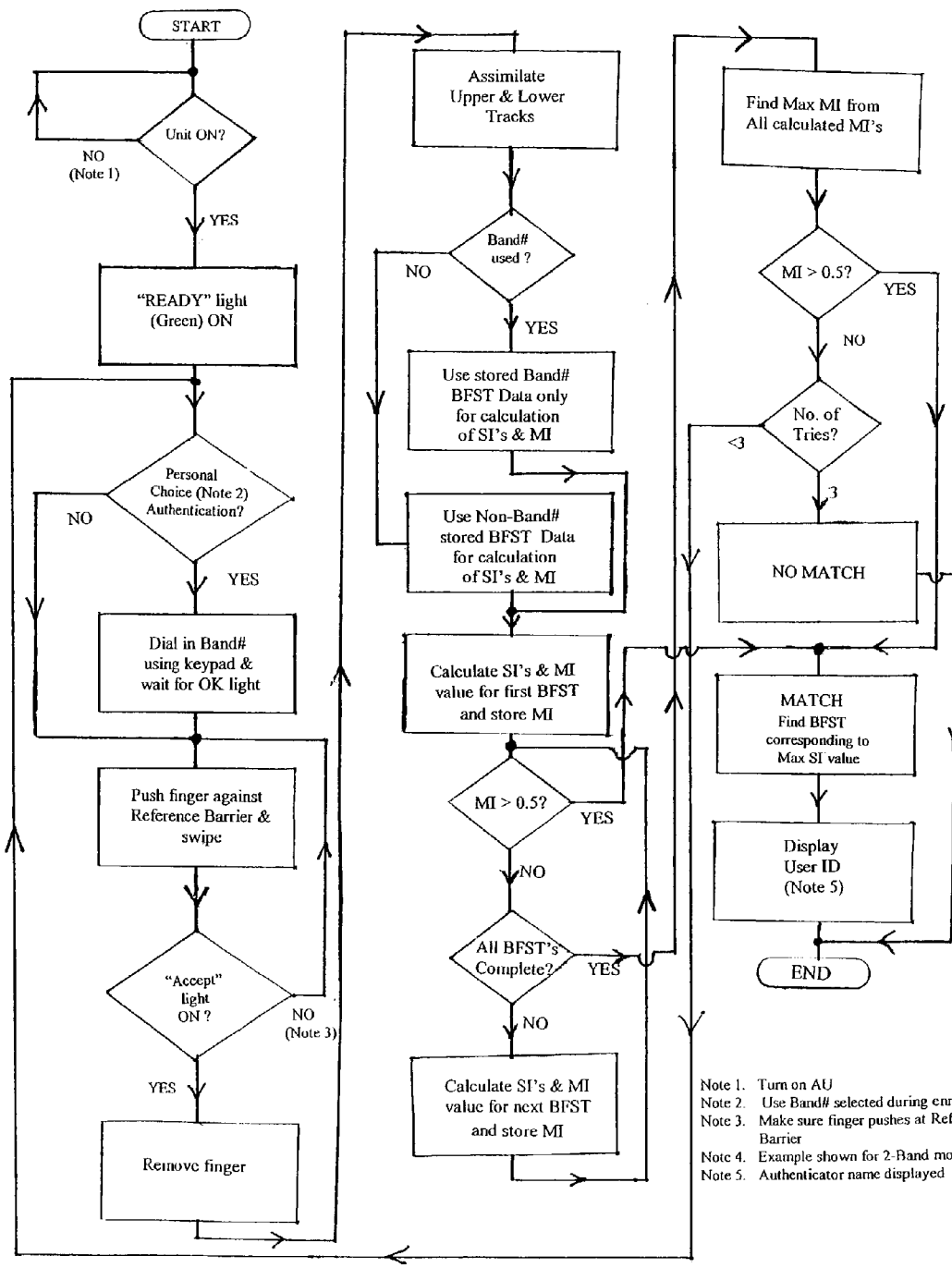
Figure 11. Flowchart for FAFA Authentication Process at Authentication Unit

METHOD FOR AUTHENTICATING AN INDIVIDUAL BY USE OF FINGERPRINT DATA

CROSS-REFERENCE TO RELATED APPLICATIONS

The present application is a continuation-in part of U.S. application Ser. No. 10/102,667 filed on Mar. 22, 2002 now U.S. Pat. No. 7,013,030 for Personal Choice Biometric Signature, which itself is a continuation-in part of U.S. application Ser. No. 10/074,011 filed on Feb. 14, 2002 for Authentication Method Utilizing a Sequence of Linear Partial Fingerprint Signatures Selected by a Personal Code, the disclosures of both of which are specifically incorporated herein by reference.

The present application is also related to another patent application being filed concurrently with this application which is entitled "Apparatus For Authenticating an Individual by Use of Fingerprint Data," with the same inventor as this application, the disclosure of which is specifically incorporated herein by reference.

FIELD OF THE INVENTION

The present invention is in the field of biometrics and personal identification, and more particularly, to the use of fingerprint data for identification.

BACKGROUND OF THE INVENTION

In the complex society that we are living in, there are numerous occasions where individuals have to authenticate themselves by means other than personal recognition. Until recently, a common approach to this has been the issuance of personal identification cards which range in complexity depending on the purpose for which they are to be used. For situations that are deemed only of secondary importance, the cards may merely contain the individual's name, signature and an identification number. Here, the presentation of the card will be proof enough of the user's identity if the card signature matches that of the user's as taken at the time of use. For situations that require a more positive identification, such cards are also provided with the individual's photograph like in the case for driver's licenses and passports.

Unfortunately, these identification instruments have become the common victims of illegal falsification and duplication. The rampant credit card fraud of recent years has certainly accentuated the inadequacy of using such personal instruments to authenticate oneself in many instances. To this end when bank-issued ATM cards were finally accepted and used by the American public in large numbers in the middle 1980's, a new identification means was introduced in what is now called the PIN number or Personal Identification Number which takes the form of an easily-memorable 4-digit decimal number.

Even though superior ways and methods exist for use in identifying or authenticating an individual, particularly those that use one's natural body codes such as faces, fingerprints, retina patterns, irises and voice prints, they have only been deployed to date in highly special circumstances where the absolute security of one's identity warrants the additional complexity. Indeed, the use of fingerprints to identify unique individuals has been around for well over a hundred years. Both "rolled" fingerprint and "flatly placed" fingerprint inked impressions are commonly used and the identification can be classified as "passive" because the individual is not required to perform any finger motions during the subsequent process of identification. As is well-known, in collecting the so-called "rolled" fingerprint impressions, an individual's inked thumb or one of other fingers is rotated from one side of the nail to the other so that the entire pattern area can be printed on paper. Characteristic features or patterns of fingerprints such as "arches", "loops: and "whorls" (referred to as "keys") are routinely employed by fingerprint-identifying technicians to define the fingerprint patterns for easier comparison and identification of them. The so-called Henry classification is often used to determine if two prints are the same even though this system requires a skilled expert to compare the individual characteristics of the prints.

Ample prior art can be found in fingerprint detection apparatus and methodology of using fingerprints for personal authentication and identification. A list of earlier issued U.S. patents relating to the prior art has been presented in the earlier filed applications identified above in the Cross-Reference to Related Applications, and reference to such patents will not be repeated again herein.

There is hardly any doubt that the prior inventions summarized above made significant progress towards simplifying the overall mechanics for the acquisition, classification, comparison and analysis of fingerprints. They have also removed in most cases the subjectivity and ambiguity in the employment of the well-known Henry classification system to determine if two prints is matched. However, there are still many shortcomings today in the use of full fingerprints to identify and authenticate individuals. These shortcomings are briefly discussed as follows.

First of all, there is potentially a privacy issue looming when one is required to use one's full fingerprint in the future as a way to authenticate oneself, especially when the level of security required does not justify the use of such a unique and private identification apparatus. Rightly so, many people today still consider their fingerprints as very private and the mandatory requirement for their use in order to verify themselves in their everyday life is considered as an outright privacy invasion. Imagine starting from a certain date onwards, one is required to identify oneself everywhere one goes and everything that one does with one's fingerprint. Since one's full fingerprint is uniquely and absolutely traceable to oneself, and furthermore, it is kept by Big Brother and many establishments such as banks, hotels, company where one works etc., it is likened to letting somebody know every move that one makes for the rest of one's life. Worse still, when this is coupled with the fact that one's fingerprints are easily "skimmed" and falsified, such as with the use of the so-called "gummy fingers" technique, one's concern about privacy and fraud would no doubt turn into a nightmare. It is commonplace for individuals to casually leave behind their fingerprints in performing their normal daily activities such as the handling of glasses and utensils when eating in restaurants, touching objects of all kinds in public places etc. without ever heeding the potentially serious consequences. The fact is that it is actually quite easy for someone to lift an individual's fingerprints left behind in such instances. This will be likened to the stealing of one's most private personal identity in order to commit all kinds of fraud against the individual without that individual even knowing about it until it is too late. Many people argue that such fingerprint skimming and falsification for committing fraud episodes will never happen. The same was said once to the magnetic stripe credit card fraud in the early 1960's when only a handful of cards were issued. But when the deployment of fingerprints becomes as popular and numerous as magnetic stripe credit cards of today, such skimming and falsification fraud is simply inevitable and the situation is likely to be even worse than magnetic stripe card fraud of today because once one's fingerprint is compromised, there is absolutely no way to rectify it.

Almost all fingerprint analysis methodology developed and in use today relies upon the number of minutiae, their classifications and their spatial coordinates of any two fingerprints as the basis for their "match" or "no match" decisions. Such a methodology requires the use of a full and a reasonably good fingerprint image resolution (>200 dpi) for analysis. Thus, full fingerprint readers used for authentication of individuals today all generate one's full fingerprint image to start whether the sensor is a silicon IC imager (imaging CCD), optical scanner, capacitance array or thermal-detector array imagers. Except for some very expensive optical scanners, all the other fingerprint readers are hardly robust enough to withstand the heavy use and rough handling by the user public, especially in unsupervised situations when there is nobody around to safeguard the proper use and prevent the mishandling of these devices. Accordingly, for fingerprint readers of today, they are either too expensive for wide use applications, or they are simply not robust enough to be practically viable. Common abuses such as ESD (electrostatic discharge), scratching and/or excessive use of pressure, water on the device surface due to condensation of moisture in the air or the use of wet, oily or dirty fingers, all are reasons why these devices have routinely failed lately during extensive field trials, particularly in unsupervised situations.

Thus, despite the deployment of enormous amounts of manpower and resources over the years to the development of fingerprint readers, both in fingerprint analysis software and image generation hardware, there is still a long-felt and urgent need for the availability of a low-cost and robust fingerprint reader for no supervision situation deployments. Furthermore, in order to alleviate the impact of privacy issues and the threat of "gummy fingers" skimming and falsification of one's fingerprints for the purpose of committing fraud, a new methodology utilizing only a subset that cannot be traced back to the full fingerprint, and not the full fingerprint itself, is needed that will eliminate both of these additional potential shortcomings for full fingerprint readers in use today.

SUMMARY OF THE INVENTION

The present invention is generally directed to a method for authenticating an individual by use of fingerprint data that involves two different broad steps. The first step is to obtain a biometrics fingerprint signature template ("BFST") for an individual in an enrollment process. This is done by selecting a plurality of bands for the BFST and obtaining a plurality of tracks corresponding to each of the plurality of bands by use of an enrollment frame of a selected finger of the individual, wherein the plurality of bands are spatially referenced to the enrollment frame and can be spatially referenced to a reference barrier. The second step is to authenticate (or not) a candidate finger against one or more BFST in an authentication process. This process begins by selecting a swipe direction and an access code for the individual, obtaining a plurality of candidate tracks from the candidate finger through use of the reference barrier in an authentication unit so that each of the plurality of candidate tracks is spatially referenced so as to be within a corresponding one of the plurality of bands, calculating a similarity index for each of the plurality of candidate tracks and each of the plurality of tracks for the band to which the candidate track corresponds by use of a Fast Fourier-transform fingerprint algorithm, and using the maximum similarity index calculated for each of the plurality of tracks in the preceding step to determine if the candidate finger and the BFST match.

In a first, separate group of aspects of the present invention, a BFST is obtained from an enrollment unit in which the enrollment frame is determined by use of physical boundaries of a swipe area for obtaining a fingerprint image of the individual and two or more fiducial marks are used for calibration in obtaining the enrollment frame. The enrollment unit can use a standard full fingerprint reader capable of obtaining an image with a resolution better than dpi>500 modified to include the enrollment frame. The physical boundaries of the enrollment are comprised of an enrollment unit reference barrier that aligns the finger in a North-South orientation within the reference frame and two side limiters that define East and West physical boundaries.

In a second, separate group of aspects of the present invention, a selected finger of an individual is swiped in the authentication unit in a linear direction at least once, which can be either west-east ("W-E") or east-west ("E-W") with respect to the Northern reference barrier. The individual can be allowed to select an access code by selecting a number of swipe passes and the W-E or E-W orientation of the number of swipe passes in the authentication process; however, such choice need not be allowed, and the swipe direction and the access code can be preselected by somebody other than the individual as part of the enrollment process, and the access code can be only one swipe in a preselected direction.

In a third, separate group of aspects of the present invention, a full fingerprint of a selected finger can be divided into a group of P bands spaced from a starting point determined by the reference barrier where P is an integer of 2 or more and there is no spacing between adjacent bands within the group. During the enrollment process, the individual can be allowed to select the plurality of bands that is used in the individual's BFST (which can have fewer than P bands) from the group of P bands. The plurality of bands is preferably a subset of a full fingerprint and not sufficient to identify the full fingerprint using conventional fingerprint analysis in the absence of the full fingerprint, but it need not be, and it can comprise a full fingerprint. Each band is comprised of a group of regularly spaced tracks, such as 10 or more, separated by d mm bunched together as a record. Each band has a minimum physical width that is chosen to achieve the functional purpose of insuring that acceptable positional variation of the candidate finger relative to the reference barrier will be less than the minimum physical width so as to insure that a candidate track obtained for a chosen band in the authentication process will correspond to one of the plurality of tracks obtained for that chosen band in the enrollment process. Each band has the same minimum physical bandwidth, which can be approximately 2 mm.

In a fourth, separate group of aspects of the present invention, each track of a plurality of tracks in a BFST and a plurality of candidate tracks can be digitally formatted from a linear signature made up of a straight line horizontal ridge-valley contour of a fingerprint. Each track itself can be configured as N pixels each pixel having a numerical value, and N is equal to $2^M$ where M is an integer, a preferred example of which is M is set equal to 8 and N is 256. An algorithm is used to adjust the widths of the tracks so that they are the same and the width of the plurality of candidate tracks should be smaller than the width of the BFST tracks before the algorithm adjusts them to the same width. The physical width of each of the plurality tracks is chosen to achieve the functional purpose of insuring that the maximum similarity index calculated for a candidate track taken at any physical location within the band, when combined with one of the plurality of tracks for that band, will exceed 0.7. The similarity index is a Hermitian dot product of $FFTA_k$ and $FFTB_k$, wherein $FFTA_k$ is a Fast Fourier Transform corresponding to a first track A, $FFTB_k$ is a Fast Fourier Transform corresponding to a second track B, and k denotes a digitized channel number corresponding to a fixed time period. The trackwidth of each of the tracks is between approximately a few microns to a few thousandths of an inch.

In a fifth, separate group of aspects of the present invention, the plurality of candidate tracks obtained during the authentication step can be derived from detector output of an optical source/detector setup in the authentication unit located beneath a swipe area and one or more scan orifices over which the finger is swiped. The optical source/detector setup can use multiple orifices with an optical source/detector setup located beneath each orifice so that a linear signature is obtained from a detector output of each setup at a fixed data rate. Each optical source/detector setup can use a total internal reflection optical arrangement for an impinging and reflected light at the orifice and include an optically transparent plate located at the orifice over which the finger is swiped. The optically transparent plate can have a refractive index for 650 nm light not less than 1.768 and be made of sapphire or SF11 glass.

In other, separate aspects of the present invention, each maximum similarity index obtained for each of the plurality of candidate tracks is multiplied to calculate a match index that is used to determine whether the individual is authenticated for a given BFST. A match is obtained if the match index exceeds a preselected threshold, which can be equal to or greater than 0.5 when only two similarity indexes are multiplied to obtain the match index. A match index can be calculated in the authentication step for a plurality of BFST to determine if a match is obtained as to any of the BFST, and the process of determining for which, if any, of the BFST there is a match can be terminated when a match index exceeds a preselected threshold or by choosing the highest match index for all of the BFST as long as that match still exceeds a preselected threshold.

In a further, separate aspect of the present invention, the BFST for an individual can be obtained from a stored file containing a fingerprint image by spatially orienting and scaling the fingerprint image to be compatible with the enrollment frame in both directional orientation and dimensional scale so as to determine the first and the second band within the stored file.

Accordingly, it is a primary object of the present invention to provide improved methods for authenticating an individual by use of fingerprint data.

This and further objects and advantages will be apparent to those skilled in the art in connection with the drawings and the detailed description of the preferred embodiment set forth below.

BRIEF DESCRIPTION OF THE DRAWINGS

FIG. 1a shows a typical linear signature which is a horizontal straight line ridge-valley contour of a fingerprint running in a direction from West to East.

FIG. 1b shows the linear signature shown in FIG. 1a displayed as a detector output of an optical sensor/detector setup where the ridge center of the contour is represented by a positive voltage value and the valley center is represented by a voltage value close to zero.

FIG. 2 is an optical light source/detector setup for generating linear signatures as shown in FIG. 1b.

FIG. 3 is an optical light source/detector setup utilizing a total internal reflection technique for generating linear signatures shown in FIG. 1b for obtaining better signal-to-noise ratio or optical contrast.

FIG. 4a shows a linear signature as shown in FIG. 1b digitally formatted into a "track" having 256 pixels.

FIG. 4b shows the real part of the Fast Fourier Transform ($FFT_k$) corresponding to the linear signature $LS_k$ as shown in FIG. 4a.

FIG. 5a shows a reverse linear signature as that shown in FIG. 4a.

FIG. 5b shows the real part of the Fast Fourier Transform ($FFT_k$) corresponding to the reverse linear signature as shown in FIG. 5a.

FIG. 6 shows a full fingerprint reader modified by adding an Enrollment Frame defined by a reference barrier at the top and two tractable side limiters.

FIG. 7 shows a full fingerprint assimilated by FAFA into 10 bands of equal bandwidth and band separation. Each band comprises 21 tracks with uniform track separation equal to ~0.075 mm.

FIG. 8 shows a schematic layout for the Authentication Unit (AU).

FIG. 9 shows a simplified system block diagram for the Authentication Unit signal processor.

FIG. 10 is a flowchart for a FAFA Enrollment process using an Enrollment Unit.

FIG. 11 is a flowchart for a FAFA Authentication process using an Authentication Unit.

DETAILED DESCRIPTION OF THE PREFERRED EMBODIMENT

A preferred embodiment of the present invention provides new methods and apparatus for verifying or authenticating the identity of individuals using only an assimilated partial fingerprint record or a subset of the fingerprint. The result is in an extremely robust and low-cost authenticating unit that alleviates the concern of privacy invasion and the threat of "gummy fingers" skimming and falsification fraud.

The present invention also provides a method for verifying or authenticating the identity of individuals using a sequence of one or more partial fingerprints (linear signatures) to be used during both enrollment and subsequent authentication. This particular sequence in which they are selected is arranged to constitute a user's PIN-like personal code.

The present invention also describes a system comprising an "Enrollment Unit (EU)" which is a modified full fingerprint reader equipped with a reference frame for accurately placing the finger and a custom-developed software algorithm to first obtain a spatially referenced full fingerprint image and then assimilate a selected subset of said image into a Biometrics Fingerprint Signature Template (BFST) for the individual. The system also comprises a separate "Authentication Unit (AU)" which is a robust and simple optical sensor unit for generating a corresponding subset of an individual's full fingerprint to be used with the individual's enrolled BFST for identity authentication.

The EU allows the user to conveniently select the content of his/her Biometrics Fingerprint Signature Template (BFST) as an irretraceable subset of one's full fingerprint image for later authentication by the "Authentication Unit (AU)". This system is capable of defeating a "Big Brother's" ability to track down one's activities anywhere and at any time thus potentially intruding into one's privacy.

Additional advantages and features of the present invention include further advancement of a novel fingerprint analysis method called "FAFA" or Fourier-transform Assimilation Fingerprint Algorithm using only a subset of one's fingerprint to authenticate one's identity; to facilitate the replacement of specially trained and experienced fingerprint identifying technicians with a relatively simple, robust and low-cost device that can be manufactured in high volumes to thereby render the task of personal authentication using fingerprints simpler, less costly and less subjective to personal opinion, and to safeguard the use of fingerprints to identify individuals from the potential threat of privacy intrusion and illegal recovery of fingerprints and their subsequent fraudulent use.

Although the present invention still uses one's basic fingerprint as a means to authenticate one's identity, it departs significantly from the manner of its traditional utilization. Instead of the entire inked impression of fingerprints ("rolled", "flatly placed" or electro-optically generated full fingerprint image or equivalent) and its associated characteristic features or patterns such as "arches", "loops" and "whorls" and their numerical presence and spatial coordination, only certain pre-defined partial fingerprints in the form of straight line horizontal ridge-valley contours across one's fingerprint designated as "linear signatures" need be used. Typically two or more groups of linear signatures separated by a pre-defined distance are generated for use as one's enrolled template or Biometrics Fingerprint Signature Template (BFST). A group of regularly spaced linear signatures ~0.075 mm apart comprising upwards of 20 in number is called a "band". Thus one's enrollment template or BFST comprises two or more bands of linear signatures each containing upwards of 20 or so linear signatures or "tracks separated by typically 5–6 mm. Table I below summarizes all the definitions for glossary words used in the current patent application.

TABLE I

GLOSSARY

| | |
|---|---|
| Linear Signature | A straight line ridge-valley contour running horizontally across a full fingerprint |
| Track | A linear signature, preferably configured as N pixels each pixel having a numerical value and N is equal to $2^M$ where M is an integer, e.g. 128, 256 etc. |
| Track Separation | Distance between adjacent tracks ('d' mm) |
| Band | A number of tracks separated by d mm bunched together as a record |
| Bandwidth | Physical width of a band in a North-South orientation, equal to (K-1)d mm where K is the number of tracks in the band |
| Trackwidth | Physical width of a track within a band in an enrollment record or the physical width of an authentication track |
| Upper Band | The top-most band of a multi-band record |
| Lower Band | The bottom-most band of a multi-band record |
| Band Separation | The physical distance between two adjacent bands measured from the center of the band |
| Reference Barrier | The top-most wall or physical barrier encountered by one's finger during enrollment or subsequent authentication |
| Tractable Side Limiters | Movable physical barriers on the left and right side of an area where one's finger is placed for its image taking during enrollment |
| Enrollment Frame | The physical boundaries of an area with fiducial markings on the platen of a conventional fingerprint reader for obtaining an individual's fingerprint image during enrollment which can be spatially referenced to |

TABLE I-continued

GLOSSARY

| | |
|---|---|
| | the Reference Barrier and calibrated to the physical widths of subsequent authentication tracks |
| Reference Height | The physical distance between the Reference Barrier and the upper edge of the Upper Band |
| Enrollment Unit (EU) | A standalone unit used to obtain an individual's Biometrics Fingerprint Signature Template (BFST) via the use of a fingerprint reader to record the fingerprint image together with developed custom assimilation software |
| Authentication Unit (AU) | A standalone unit used to verify an individual's Biometrics Access Code Signature (BACS) against his stored Biometrics Fingerprint Signature Template (BFST) |
| BFST | An individual's biometrics fingerprint signature template assimilated as a partial fingerprint record from a full fingerprint image |
| Authentication Tracks | The upper and lower tracks of an individual generated by the Authentication Unit during his authentication process |
| Scan Direction | The horizontal direction (either West to East or vice versa) an individual uses to present his BACS signature |
| Access Code (BACS) | The sequence of Scan Directions an individual uses to present his BACS signature or Authentication Tracks |
| Similarity Index (SI) | The Hermitian product of the linear FFT's of two tracks having a real value between "0" and "1" |
| Match Index (MI) | The product of the maximum of the SI values generated by one's BACS signature obtained during authentication with his stored Biometrics Fingerprint Signature Template (BFST); for two bands MI >= 0.5 for a positive match and MI < 0.5 for a no match |

A regular full fingerprint reader with only a slight modification so as to provide an "enrollment frame" (see Table 1) for the finger to be accurately and repeated placed is used as an Enrollment Unit (EU) to generate an individual's enrollment record or BFST. The only other requirement is that the fingerprint image so generated should have a resolution better than dpi>500 and fiducial marks should be used on the platen of the Enrollment Unit (EU). Custom developed software is used to assimilate the individual's full fingerprint image into a properly formatted enrollment template or BSFT in the form of specially formatted sets of "bands". During enrollment, the individual can be permitted to select a particular set of bands as one's BFST. It is because of this particular feature of the present invention that an individual can select different BFST's for the individual's biometrics fingerprint signature for authentication at different establishments. For example, one can select Set A of bands as one's BFST at bank No. 1 and Set B of bands at credit card association No. 2 and so on. Unlike the case when one uses one's full fingerprint as one's biometrics signature, an individual has to use the same signature at all establishments during the enrollment process.

It is to be specifically noted that although one's full fingerprint image is taken during enrollment, it should be destroyed after the assimilation of one's particular BFST to preserve the privacy advantage that can be achieved by the present invention. As long as the full fingerprint record is destroyed after the assimilation of the BFST during the enrollment process and is not stored in a data bank, the subsequent BFST used in subsequent authentication cannot be traced back to any fingerprint. However, the assimilated BFST's can be traced back to the original fingerprint as long as the latter is properly formatted according to the FAFA methodology. Thus any existing fingerprint data bank can be reformatted according to the FAFA methodology and there-after one's BFST can be uniquely retraced back to the original fingerprint existing in any data bank.

During subsequent authentication for an individual, the Authentication Unit (AU) generates only two or more "tracks" from one's fingerprint, namely one in each of the two or more enrollment bands described above. A "track" is a custom linear signature digitally formatted for use with the two or more bands enrollment template or BFST using the specially developed analysis software (see below) for deciding whether there is a match or no match. These tracks are generated by a specially designed optical source/detector assembly called the Authentication Unit (AU). The design of this AU provides both a "start" and a "stop" contact switch at the Reference Barrier location to ensure that the physical width of one's authentication tracks in the direction of scanning is the same as that obtained for one's enrollment record according to the fiducial marks on the platen of the Enrollment Unit (EU). It is important to note that the overall system (both the EU and the AU) ensures that the authenticated tracks of an individual to be authenticated always lie within the respective bands comprising his BFST.

A novel fingerprint analysis software program called "FAFA" or Fourier-transform Assimilated Fingerprint Algorithm has been developed. It is applicable to the concept of using linear signatures, instead of minutiae, as the basis for making fingerprint templates matching decisions. Specifically it can be used to generate a so-called "Similarity Index" or "SI" between two digitally formatted linear signatures. Furthermore, from the generated SI's between one's BFST (Biometrics Fingerprint Signature Template) obtained during the enrollment process and the tracks during one's subsequent authentication, a value of "Match Index" or "MI" can be calculated which determines whether an fingerprint template acquired during authentication matches the enrollment template for the individual.

So far we have discussed the utilization of 2 or more bands of one's fingerprint during enrollment for obtaining one's Biometrics Fingerprint Signature Template (BFST) and the use of correspondingly 2 or more tracks during authentication. Indeed the same methodology applies to the use of multiple bands during enrollment and the use of the same number of tracks, each of which lies within a respective band during authentication. The more bands and tracks are used, the higher the security level that can be achieved. When the methodology is applied to the use of more than one band and track, the enrollment hardware remains unchanged with only a simple software modification for generating the BFST. However, both the authenticator unit hardware and the FAFA fingerprint analysis software have to be changed and reformulated respectively in order to accommodate a multiple band/track usage with a concomitantly much higher attainable security level.

In one specific application when one is concerned with the potential intrusion of one's privacy, it is possible to apply the methodology advanced in the present invention to a modified system that could directly cope with this problem. In this case, one's fingerprint to be used for one's verification can be divided into "P" closely packed bands (i.e. there is no spacing between adjacent bands) where P is an integer covering the entire fingerprint. (Please refer to Table I for the definition of glossary of terms and words used in this application.) Thus one can label the bands conveniently from the topmost one as P1, P2 . . . down to PN, the bottom-most band respectively. During the enrollment that uses two bands as an example, one can select at one establishment any two bands in the assimilation of one's BFST, e.g. P(N−3) and P(N−9) where N is the total number of available bands. At another establishment, one might use P(N−2) and P(N−8) and so on. Thus unlike using one's full fingerprint at all establishments for one's authentication, which can be absolutely traced to one's activities in both time and place, and is tantamount to the situation when one is being followed by a video camera, the use of a number of subsets of one's fingerprint as different irretraceable BFST's at different establishments will defeat this potential privacy intrusion threat.

For whatever number of band/track used in the assimilation of one's BFST in the presently invented methodology, one can invoke more than one swipe during one's authentication process to further improve the level of security. Since there are two distinct horizontal swiping directions, namely one from left to right or West to East and the other from right to left or East to West, one can make a choice which direction to swipe one's finger even during a single swipe situation and there is a factor of "2" improvement in the achievable security level. If one uses two swipes during the enrollment and subsequent authentication, one picks up an additional factor of "4" in the security level achieved. Similarly if one uses four swipes during enrollment and subsequent authentication, an improved level of security equal to a factor of "16" in this case can be realized. The choice in making the sequential swiping directions for cases involving one or more swipes is likened to invoking one's PIN number when a "0" is assigned to one particular swiping direction (e.g. West to East) and a "1" is assigned for the opposite direction or from East to West. Thus a PIN number of "0110" chosen by an individual for a four-swipe application indicates that his personal choice for presenting his fingerprint during authentication is sequentially W-E, E-W, E-W and W-E respectively where "W" and "E" stand for West and East respectively.

Thus the present invention, in addition to advancing the method of using only one's selected partial fingerprints for enrollment and subsequent authentication, thereby giving back the individual a choice of privacy preservation and fingerprint falsification fraud resistance, also simplifies the enrollment and authentication processes in the use of the so-called linear signatures. It could further provide the individual a PIN-like access code for additional security protection, if so desired. Finally, the methodology advanced in the present invention enables the design and construction for the Authentication Unit, and not necessarily the enrollment unit since its use is always under supervision, to be extremely robust and low-cost, two critical performance characteristics that are needed before biometrics identification devices can be widely distributed for use in the public arena, especially in unsupervised situations.

The present invention will now be described in even greater detail by reference to the Figures and especially preferred embodiments.

Instead of using the entire impression or electronic image of fingerprints and their associated characteristic keys for identification purposes, an especially preferred embodiment of the current invention employs instead one or more horizontal or West-East straight line ridge-valley contours across a fingerprint called "linear signatures" as the principal elements of distinction among different fingerprints. FIG. 1a shows a typical linear signature which is a straight line horizontal ridge-valley contour of a fingerprint running in a direction from West to East. FIG. 1b shows the same linear signature displayed as the detector output of an optical source/detector setup where the ridge center of the contour is represented by a positive voltage value and the valley center is represented by a voltage value close to zero.

Linear signatures like the one shown schematically in FIG. 1b can be generated by swiping one's finger on a platen across a small orifice located at the center and through which light emerges from underneath as a spot as depicted in FIG. 2. As shown in FIG. 2, a small orifice 1 is located at the center of platen 2. Light ray shown by arrow 3 originated from light source 4 impinges at the orifice 1 in the direction shown by the arrow 3. The reflected light from the orifice 1, shown by the arrow 5, is detected by detector 6. A finger can be swiped across the orifice 1 horizontally from West to East as indicated by arrow direction 7 or it can be swiped in the opposite direction, namely from East to West, as indicated by the arrow direction 8. Depending upon whether a "ridge" or "valley" of the fingerprint is located on top of or behind orifice 1 during the swipe, the reflected light intensity, as detected by detector 6, will vary from an apparent maximum (ridge behind orifice) to an apparent minimum (valley or void behind orifice). Thus as one swipes one's finger across the orifice 1 on the platen 2, the horizontal straight line ridge-valley contour (see FIG. 1a) will appear as a graphical plot shown in FIG. 1b where the ordinate shows the output of the detector 6 in arbitrary units and the abscissa shows the time elapsed or distance traveled by the finger across the orifice 1. In order to obtain a better experimental linear signature plot in terms of signal to noise ratio or contrast, one can resort to the use of a total internal reflection optical arrangement for the impinging and reflected light at the orifice 1 as depicted in FIG. 3. In FIG. 3, the impinging light 3 emanating from light source 4 is first made to traverse a sapphire slab 9 such that the resulting reflection at the orifice 1 is totally internal reflected. Under this optical arrangement, when the "ridge" of one's fingerprint is on top of or behind the orifice 1, the reflected light 5 is not totally internal reflected as some light is being absorbed at the sapphire/fingerprint skin interface. The resulting detector signal is no longer at a maximum as in the earlier optical arrangement case (see FIG. 2). Similarly when the "valley" of one's fingerprint is on top of or behind the orifice 1, little or no absorption takes place at the sapphire/air interface and the reflected light 5 is totally internal reflected. The resulting detector signal is therefore at or close to a maximum.

The linear signature shown in FIG. 1b can be digitally formatted into a "track" (see Table I for definition) as shown in FIG. 4 which is a linear signature configured as N pixels each pixel having a numerical value, and N is equal to $_2M$ where M is an integer. The typical M value is set equal to 8 and the resulting number of pixels, N, in a "track" is 256 as depicted in FIG. 4a. In FIG. 4a, the ordinate "$LS_k$" denotes the linear signature reflected signal from the underside of the finger in arbitrary units as received by the detector 6, and the "k" in the abscissa and the subscript "k" in the ordinate denote digitized channel number ranging from 0 to 256. In other words, the entire analog signal as a function of time received from detector 6 during the swiping of the finger is digitized into 256 channels each representing a fixed time period, e.g. 1 millisecond. FIG. 4b shows the real part of the Fast Fourier Transform ($FFT_k$) corresponding to the linear signature, $LS_k$, as shown in FIG. 4a.

FIGS. 5a and 5b show respectively a reverse linear signature (i.e. swiping in the opposite direction) of that shown in FIG. 4a and the real part of its Fast Fourier Transform ($FFT_k$). One of the great advantages advanced in the present invention is the use of linear Fast Fourier Transform (FFT) methodology to determine very quickly the extent of the matching between any two distinct and properly formatted linear signatures, e.g. $LSA_k$ and $LSB_k$ with their corresponding linear FFT's, viz. $FFTA_k$ and $FFTB_k$. We formulate the concept of the so-called Similarity Index (SI) for the matching criteria between two linear signatures $LSA_k$ and $LSB_k$ by defining it as the Hermitian dot product of $FFTA_k$ and $FFTB_k$. The Hermitian dot product itself is simply the algebraic dot product of the vector $FFA_k$ and the complex conjugate of $FFTB_k$, or vice versa. By definition, the SI value is always a real number having a value between "0" and unity. Furthermore, the value of SI between two linear signatures reflects the extent of their matching. Thus a SI value of >0.6 indicates that the two linear signatures are very well matched and a SI value of <0.3 indicates that the two linear signatures are not well matched at all.

The linear FFT methodology and the conceptual formulation of the Similarity Index (SI) to quantitatively determine the degree of matching between any two linear signatures elucidated above form the foundation for the advent of a new and novel fingerprint analysis algorithm not based upon the use of minutiae. Furthermore, this new fingerprint analysis algorithm called "FAFA" or "Fourier-transform Assimilation Fingerprint Algorithm" uses a subset of one's fingerprint, instead of one's full fingerprint, in the form of one's linear signatures assimilated from one's full fingerprint, for one's identification and subsequent authentication. Thus during the initial enrollment, only a subset of one's fingerprint, assimilated in the form of two or more bands of linear signatures (see Table I for definition), is used as one's enrollment record. For subsequent authentications, two or more "tracks" of one's fingerprint, each lying respectively within one of the two or more enrollment bands, which again is only a subset of one's fingerprint, need to be generated for carrying out the authentication process.

Thus a unique feature of the presently invented FAFA fingerprint analysis software is its ability to use only a subset of one's fingerprint for one's identification and subsequent authentication. An even more unique and important feature of FAFA, which is pivotal in combating "Big Brother's" or any establishment's potential intrusion of one's privacy, is the ability afforded to individuals in the selection of one's enrollment record. Since one's enrollment record is a subset of one's full fingerprint, there can therefore be many such subsets at one's disposal for selection during one's enrollment. Instead of having to surrender one's full fingerprint during enrollment required literally in all fingerprint analysis software based upon the use of minutiae in order to facilitate and effect the subsequent authentication process, only a subset of one's fingerprint, to be selected solely by the individual, suffices. Thus even though the image of one's full fingerprint is taken during the enrollment process (see FAFA implementation to be described below), only a certain set of one's fingerprint bands selected by the individual need be retained and used as one's enrollment record. Meanwhile at the request of the individual, the individual's full fingerprint electronic image can be or must be destroyed after the enrollment process.

The fact that one is required to place one's finger on the platen of a standard fingerprint reader in order to have its image taken during enrollment is certainly of no, comfort to some people who are more sensitive than others about the issue of personal privacy encroachment. Explaining to these individuals that only a certain set of their fingerprint bands, and not the full fingerprint, is actually being retained and that their full fingerprint will be destroyed after the enrollment is of little help to overcome their suspicion and fear. However, it is possible to mask the platen of a standard fingerprint reader with a specially designed printed ink pattern comprising a number of blackened bands thus protecting that part of the individual's fingerprint masked by these darkened bands from being imaged or recorded during enrollment. Under such a circumstance, it will be both easy and reassuring for the individual to recognize that it is not their full fingerprint image that is being recorded and therefore potential privacy intrusion is no longer a matter of their concern.

Without the original full fingerprint impression or electronic image record, the subset of one's selected fingerprint in the form of one or more linear signature bands, cannot be traced back to one's full fingerprint. However, if one's full fingerprint is not destroyed as requested or it exists previously in certain data bases, it is possible to uniquely trace one's one or more FAFA enrollment records back to one's archived fingerprint. This latter chore would be made much easier if one's full fingerprint existing in a data base can be a priori assimilated into enrollment subsets according to FAFA's methodology.

Thus if one enrolls using different FAFA subsets of one's fingerprint at different establishments and making sure that at each occasion after the enrollment one's fingerprint is destroyed, one's activities cannot be tracked as in the case when one uses a full fingerprint to enroll at each and every establishment. This is because of the fact that while one can be readily and biometrically authenticated at each and every establishment, one's FAFA enrollment records cannot be used to definitively trace back to that individual without the a priori existence of the individual's full fingerprint record. However, if one's fingerprint has already been archived in one or more data bases, then it is possible to use one's FAFA enrollment record to uniquely track that individual down, especially if the individual's fingerprint can be assimilated a priori according to the FAFA algorithm. In the present context, it can readily be seen that FAFA does not in any way eliminate the usefulness of existing full fingerprint data bases of millions of individuals archived or cataloged by many government agencies or establishments for various purposes. As pointed out earlier, if one's full fingerprint exists at all, it is possible to track the individual down using only one or more of his partial FAFA enrollment records.

The present invention is in essence a two-step process. The first step is enrollment. In this process, the electronic image of one's fingerprint (preferably one's index finger for its inherent dexterity for the swiping motion) can first be attained by a standard full fingerprint reader modified to have an "Enrollment Frame" (see Table I) which defines the physical boundaries of an area for obtaining an individual's fingerprint image during enrollment which can be spatially referenced to the "Reference Barrier" and the two "Tractable Side Limiters" (see Table I) as depicted in FIG. 6. As shown in FIG. 6, the reference barrier 10, tractable side limiters 11 and 12 define the physical area for the fingerprint reader 13 where the finger should be placed during enrollment. Not shown in FIG. 6 are two or more fiducial marks in the form of "+" signs hidden behind the finger used for calibrating the actual physical width of one's fingerprint used in his enrollment record. As their name implied, the tractable side limiters 11 and 12 are symmetrically movable with respect to the centerline 14 in order to accommodate any reasonable size finger. It is also required that when the finger is placed for having its image taken, the tip or top part of the finger 15 must be gently pushed against the reference barrier 10. This is extremely important as the location of the topmost band and hence the rest of the bands are referenced from this reference barrier 10. As will be explained below, the Authentication Unit (AU) which is subsequently used to generate one's authentication record for one's authentication also uses this reference barrier 10 as an important location reference for the authentication tracks to be generated.

In addition, a custom software program compatible with the FAFA fingerprint analysis algorithm has been additionally developed to assimilate one's full fingerprint image into N partial linear signature bands running horizontally from West to East as shown in FIG. 7 for N=10. Thus in FIG. 7 there are ten horizontal linear signature bands shown starting with the topmost band being band No. 1 to the bottommost band being band No. 10. Each of the bands has a "Bandwidth" (see Table I) equal to ~2.0 mm and the "Band Separation" (see Table I) equal to ~6.0 mm. Each band comprises ~21 "tracks" with the "Track Separation" (see Table I), which is the physical separation between adjacent tracks, having a value equal to ~0.075 mm, and is the same for all tracks in all 10 bands. Note that in the current FAFA enrollment model the "Trackwidth" of the tracks within a band (see Table I) is relatively unimportant and it can have any reasonable small value like a few microns. However, the trackwidth in the FAFA authentication model is a very significant parameter. The lower limitation of the authentication trackwidth is really a matter of design choice and hardware limitations. The upper limitation of the authentication trackwidth is set by the physical dimensions of ridges and valleys found in a fingerprint since a trackwidth should obviously not be sized to be so large as to be meaningless in its ability to create a linear signature. During enrollment and for a 2-band implementation model, one has a choice of 28 combinations (e.g. bands 1 &4, 2&6, . . . 6&10 etc.) if the 2 bands chosen are 3 bandwidths or 6.0 mm apart. One has more or less choices for one's FAFA enrollment record if the 2 bands chosen are closer together or farther away respectively.

The selection of the bandwidth depends on only one factor and that is to guarantee that the inevitable variation of one's finger tip when pressed or pushed against the reference barrier during subsequent authentication trials can be absorbed or dealt with without causing a registration problem and hence uncertainty or errors. If one can guarantee that this variation in a particular physical AU design is less the 1 mm, then a bandwidth of 1.5 mm is adequate and safe. If on the other hand the variation one determines is 1.5 mm, a bandwidth of 1 mm will not work but 2 mm bandwidth would be fine. A general rule of thumb is that one should use as small a bandwidth as possible as long as it solves the positional variation problem of the swiping finger during subsequent authentications with respect to the reference barrier. As long as the two authentication tracks lie within respectively the Upper and Lower bands, it is fine.

For a 2-band model of the FAFA enrollment record methodology which for simplicity is chosen to illustrate its implementation in the current patent disclosure, one refers to the top band as the "Upper Band" and to the bottom band as the "Lower Band" (see Table I). The custom software program resident within the Enrollment Unit (EU), which can be just a modified standard full finger reader, is used to assimilate the two selected FAFA bands from the full fingerprint image into an enrollment record comprising 42 tracks with 21 tracks belonging to the Upper Band and the remaining 21 tracks to the Lower Band. Each of the tracks in the enrollment record is digitized and has 256 pixels. This enrollment record can be looked upon as 42 specially formatted data files compatible with the FAFA fingerprint analysis algorithm. With this enrollment record of an individual we shall now show below how such a record can uniquely authenticate this individual when his authentication record is subsequently generated using one's same finger with the Authentication Unit (AU) and applying the FAFA fingerprint analysis methodology.

FIG. 10 is a flowchart for a FAFA Enrollment Process using an Enrollment Unit (EU) as perceived by an individual using the EU.

As alluded to earlier, the present invention is a two-step process. The first step or the enrollment step has been presented earlier above. The second step or the authentication step is now described below. An optical source/detector arrangement utilizing the total internal reflection technique as depicted in FIG. 3 is designed to constitute as the Authentication Unit (AU). FIG. 8 shows schematically the layout for the Authentication Unit (AU). A prominent feature of this AU design is the appearance of the all-important "Reference Barrier" 16 (see Table I) defining the physically topmost boundary of an area 17 against which one is to swipe one's finger facing down. Together with the side limiters 18 and 19 located on the left and right side respectively, the reference barrier 16 define the entire finger swipe area for the authentication process. The reference barrier 10 of the Enrollment Unit (EU) and the reference barrier 16 of the Authentication Unit (AU) together serve to ensure that the authentication tracks generated by the AU always falls within the respective selected linear signature bands of one's enrollment record.

Also shown in FIG. 8 in the swiping area 17 are two rectangular orifices 20 and 21 separated by a distance corresponding to the "Band Separation" (see Table I) defined in the FAFA enrollment methodology. As discussed earlier in the enrollment process, this distance is equal to three bandwidths or 6.0 mm (see FIG. 7). The thin optically transparent plates 22 and 23 which are required for the deployment of the total internal reflection technique in the optical source/detector setup protrude at roughly a 45° angle to the horizontal at orifice 20 and 21 respectively. In an especially preferred embodiment, optically transparent plates 22 and 23 are comprised of sapphire, but they can also be comprised of SF11 glass. It is preferable that optically transparent plates 22 and 23, whatever they are comprised of, have a refractive index for 650 nm light not less than 1.768.

Both the two thin sapphire plates 22 and 23 have one of their vertical edges slightly beveled and polished so that their protrusions are "flush" with the swipe area surface. The layout for the sources 24 and 25, the sapphire plates 22 and 23 and the detectors 26 and 27 are also shown schematically in FIG. 8 mounted internally inside a platform 28. Sources 24 and 25 are preferably diode lasers having a focused beam spot formed at the polished sapphire bevel surface of not larger than 0.075 mm in diameter. Detectors 26 and 27 can be standard silicon photodiodes having a sensitive detecting area not smaller than 2.0 mm in diameter. Platform 28 is also designed to be movable on tracks (not shown) with respect to the reference barrier 16 so that the distance between the first rectangular orifice 20 can be varied for accommodating a particular selection of enrollment record before the authentication process. This design enables the same Authentication Unit to be used with any enrollment FAFA band records selected by an individual as long as the band separation for the 2-band implementation remains the same as the separation distance between the two rectangular orifices 20 and 21. In the example cited above, this distance is equal to 6.0 mm.

Also shown in FIG. 8 are a start switch 29 and a stop switch 30 affixed to the reference barrier 16. Switches 29 and 30 can be used interchangeable as a start or a stop switch dependent upon the direction of the finger swipe during the authentication process. These switches define the invariant width for the linear signatures of the authentication tracks to be collected and used during the authentication process. As will be discussed later, the physical width of the authentication tracks should be the same in value as that found in one's enrollment record. However, as long as the width of the authentication tracks is smaller than that for the corresponding ones in the FAFA bands used as one's enrollment record, the FAFA fingerprint analysis algorithm will always use the same width of the enrollment tracks as that for the authentication ones. It is paramount that in the present FAFA fingerprint analysis algorithm using linear FFT techniques both the enrollment tracks and the authentication tracks should have the same width and the same number of pixels in them.

Although start and stop switches 29 and 30 ensure the same physical track width to be scanned by the source/detector setup, the amount of straight line ridge-valley contour data to be collected actually will vary because the finger swiping speed may vary from swipe to swipe during different authentication episodes. In order to ensure that the amount of data collected during authentication is neither too much nor too little for subsequent FAFA fingerprint matching analysis, the actual swipe time is measured using the start and stop switches and compared with a certain acceptable range of elapsed time. The user is told whether his authentication data is accepted or not through an indicating LED 31 mounted on the AU unit.

To complete the design for the Authentication Unit (AU) as depicted in FIG. 8, in addition to the Acceptance or No Acceptance indicator LED 31, there is also a Match/No Match indicator LED 32. LED 32 will turn green when an individual is positively authenticated. Also shown in FIG. 8 is a Ready LED 33 which indicates to the user when the AU is ready to generate authentication tracks data after the AC power cord 34 and ON/OFF switch 35 is properly plugged in and turned on respectively. Finally the AU is equipped with a data entry interface connector 36 for the transfer of the enrollment records of individuals to this unit. Connector 36 can either be an RS232C type or an USB type. Since USB data transfer is faster than the corresponding RS232C, the selection of either using the USB or RS232C depends on solely on how much enrollment data are to be transferred to the AU before its deployment in order to save setup time if deemed desirable.

FIG. 9 shows schematically a simplified system block diagram for the AU signal processor. The system depicted in FIG. 9 comprises four blocks. Block 37, the scanning or swiping device, is a platen equipped with appropriate left and right limiters and a reference barrier (see FIG. 8) to form a well-defined swiping area for one's finger. Block 37 has two small rectangular orifices located along a vertical centerline of the platen and separated by a distance "D" defined in congruence with the band separation of the FAFA enrollment records. Behind each of the two small orifices is a light source/detector combination hardware for measuring the reflectivity values of the swiping finger using a total internal reflection technique as it traverses the opening as depicted in FIG. 3. Both light sources are controlled by separate source drivers located in signal conditioning Block 38 which also receives the detector outputs for amplification and digitization before sending them onto the Digital Signal Processor Block 39. Block 39 serves a number of vital functions for the AU. First of all, it generates the authentication tracks for the individual whose identity needs to be verified. Second, it stores all the enrollment records sent to it a priori via the USB or RS232c interface connector 40. Third, it stores the FAFA fingerprint analysis algorithm and using it to decide whether the authentication of the individual is positive or otherwise using both his enrollment record and the freshly generated authentication record. Finally it controls all the AU switches and interfaces with the power supply block 41 in order to effect a trouble-free authentication process.

Another embodiment of the Authentication Unit, which can be used in the present patent disclosure, does not require one to swipe his/her index finger across two or more orifices on a platen at which the reflectivity of the straight line ridge-valley contours are being measured. Instead one's finger is rested on a platen, much like the situation when one's full fingerprint image is being taken by a standard fingerprint reader, and a mechanical stage comprising the optical source and the detector with appropriate optics moves beneath the platen on tracks from West to East or vice versa in order to acquire one's authentication tracks. In such an embodiment, the concept of swiping the finger is replaced with scanning the finger, and for purposes of simplicity of description and the claims attached hereto, in such an embodiment, an actual "scan" will be understood and defined to be a "swipe" so as to avoid further complication of verbiage herein. Moreover, the embodiment described earlier in conjunction with FIGS. 8 and 9 tends to be mechanically simpler and hence has an apparent advantage in production cost and thus is a more especially preferred embodiment.

The FAFA fingerprint analysis methodology using the FAFA formatted enrollment record in the form of 42 tracks forming the Upper and Lower bands assimilated by the EU which is a modified full fingerprint reader and the FAFA formatted authentication record in the form of 2 tracks (for the 2-band model) lying individually and respectively in the Upper and Lower bands and generated by the AU is actually quite intuitive and straightforward in view of the foregoing disclosure. Using the first authentication track that lies within the Upper Band, 21 SI values are calculated using FFT technique discussed above with each of the 21 tracks of the Upper band. In exactly the same way 21 SI values are also calculated for the second authentication track with each of the 21 tracks in the Lower Band. After proper normalization, a product is formed with the maximum of the SI values in the Upper Band and the maximum of the SI values in the Lower Band. This product is designated as the Match Index (Ml) as defined in Table I. This MI value is used to determine whether the authentication of the individual is positive or negative. For a two band system, an MI>0.5 will be positive while an MI<0.5 will be negative. When more bands are used, a lower threshold value for the MI will result in positive identification since, by definition, the MI is a product of SI values, which will be less than one, so the more SI values that are multiplied (even when an SI value exceeds 0.7, which is especially preferred), the lower the MI for a positive match will be. Moreover, use of the MI value can be implemented in different ways, especially when an AU stores a plurality of BFSTs and is testing to find whether there is a positive identification with any of the multiple BFSTs. In such a situation, an MI could be calculated for each BFST until an MI is obtained that exceeds a preselected threshold, or the individual could be authenticated for a BFST in the plurality of BFST that has the highest MI that exceeds an acceptable threshold; the choice between such options is a design choice that would take into consideration computing speed, size of data, and other factors that can be optimized by a software engineer to meet specific needs in a specific situation in view of this disclosure.

FIG. 11 is a flowchart for a FAFA Authentication Process using an Authentication Unit (AU) as perceived by an individual using the AU.

While the invention has been described herein with reference to certain preferred embodiments, those embodiments have been presented by way of example only, and not to limit the scope of the invention. Additional embodiments thereof will be obvious to those skilled in the art having the benefit of this detailed description. For example, the apparatus and methods described above make use of horizontal bands and tracks by way of reference to a reference barrier. This is because it is believed that such orientation is the simplest and most preferred way to practice the inventions taught herein. However, to a person of ordinary skill in the art having the benefit of this disclosure, it would be obvious to try and design apparatus and methods that make use of vertical bands and tracks by way of reference to a reference barrier, or to change the orientation of the reference barrier. While it is presently believed that such changes would not be as preferred as what is described herein, such changes are clearly within the scope of what is contemplated by the present disclosure. Further modifications are also possible in alternative embodiments without departing from the inventive concept.

Accordingly, it will be apparent to those skilled in the art that still further changes and modifications in the actual concepts described herein can readily be made without departing from the spirit and scope of the disclosed inventions as defined by the following claims.

What is claimed is:

1. A method for authenticating an individual by use of fingerprint data, comprising:

obtaining a biometrics fingerprint signature template ("BFST") for the individual in an enrollment process by the following steps:

selecting a plurality of bands for the BFST;

obtaining a plurality of tracks corresponding to each of the plurality of bands by use of an enrollment frame of a selected finger of the individual, wherein the plurality of bands are spatially referenced to the enrollment frame and can be spatially referenced to a reference barrier; and determining whether there is a match between a candidate finger and the BFST in an authentication process by the following steps:

selecting a swipe direction and an access code for the individual;

obtaining a plurality of candidate tracks from the candidate finger through use of the reference barrier in an authentication unit so that each of the plurality of candidate tracks is spatially referenced so as to be within a corresponding one of the plurality of bands;

calculating a similarity index for each of the plurality of candidate tracks and each of the plurality of tracks for the band to which the candidate track corresponds by use of a Fast Fourier-transform fingerprint algorithm; and using the maximum similarity index calculated for each of the plurality of tracks in the preceeding step to determine if the candidate finger and the BFST match.

2. The method as recited in claim 1, wherein the BFST is obtained from an enrollment unit in which the enrollment frame is determined by use of physical boundaries of a swipe area for obtaining a fingerprint image of the individual.

3. The method as recited in claim 2, wherein two or more fiducial marks are used for calibration in obtaining the enrollment frame.

4. The method as recited in claim 3, wherein the enrollment unit uses a standard full fingerprint reader modified to include the enrollment frame.

5. The method as recited in claim 4, wherein the fingerprint reader is capable of obtaining an image with a resolution better than dpi>500.

6. The method as recited in claim 3, wherein the physical boundaries are comprised of an enrollment unit reference barrier that aligns the finger in a North-South orientation within the reference frame and at least one side limiter that aligns the finger in a West-East orientation within the reference frame.

7. The method as recited in claim 6, wherein two side limiters are used to align the finger in a West-East direction and the two side limiters are symmetrically movable with respect to a North-South centerline of the reference frame.

8. The method as recited in claim 6, wherein the swipe direction is either west-east ("W-E") or east-west ("E-W").

9. The method as recited in claim 8, wherein the individual is allowed to select the access code by selecting a number of swipe passes and the W-E or E-W orientation of the number of swipe passes.

10. The method as recited in claim 1, wherein the selected finger is swiped in the authentication unit in a linear direction at least once.

11. The method as recited in claim 1, wherein the individual is allowed to select the swipe direction.

12. The method as recited in claim 1, wherein the swipe direction and the access code are preselected.

13. The method as recited in claim 12, wherein the access code only uses one swipe.

14. The method as recited in claim 1, wherein the swipe direction and the access code are fixed by somebody other than the individual as part of the enrollment process.

15. The method as recited in claim 1, wherein each track of the plurality of tracks and the plurality of candidate tracks are obtained from a linear signature.

16. The method as recited in claim 15, wherein the linear signature is a straight line horizontal ridge-valley contour of a fingerprint.

17. The method as recited in claim 1, wherein each track of the plurality of tracks and the plurality of candidate tracks is digitally formatted from a straight line horizontal ridge-valley contour of a fingerprint.

18. The method as recited in claim 17, wherein each track of the plurality of tracks and the plurality of candidate tracks is configured as N pixels each pixel having a numerical value.

19. The method as recited in claim 18, wherein N is equal to $2^M$ where M is an integer.

20. The method as recited in claim 19, wherein M is set equal to 8 and N is 256.

21. The method as recited in claim 18, wherein an algorithm is used to adjust the widths of the plurality of tracks and the plurality of candidate tracks so that they are the same.

22. The method as recited in claim 21, wherein the width of the plurality of candidate tracks is smaller than the width of the plurality of tracks before the algorithm adjusts them to the same width.

23. The method as recited in claim 1, wherein each similarity index is a Hermitian dot product of $FFTA_k$ and $FFTB_k$, wherein $FFTA_k$ is a Fast Fourier Transform corresponding to a first track A, $FFTB_k$ is a Fast Fourier Transform corresponding to a second track B, and k denotes a digitized channel number corresponding to a fixed time period.

24. The method as recited in claim 1, wherein the group is comprised of at least 10 tracks.

25. The method as recited in claim 1, wherein each band has a minimum bandwidth chosen to achieve the functional purpose of insuring that acceptable positional variation of the candidate finger relative to the reference barrier will be less than the minimum bandwidth so as to insure that a candidate track obtained for a chosen band in the authentication process will correspond to one of the plurality of tracks obtained for that chosen band in the enrollment process.

26. The method as recited in claim 25, wherein each band has the same minimum physical bandwidth.

27. The method as recited in claim 25, wherein the bandwidth is equal to approximately 2 mm.

28. The method as recited in claim 25, wherein the physical width of each of the plurality tracks is chosen to achieve the functional purpose of insuring that the maximum similarity index calculated for a candidate track taken at any physical location within the band, when combined with one of the plurality of tracks for that band, will exceed 0.7.

29. The method as recited in claim 25, wherein the trackwidth of each of the tracks within a given band is between approximately a few microns to a few thousandths of an inch.

30. The method as recited in claim 25, wherein a full fingerprint of the selected finger can be divided into a group of P bands where P is an integer and there is no spacing between adjacent bands within the group.

31. The method as recited in claim 30, wherein P is 2 or more.

32. The method as recited in claim 30, wherein the individual is allowed to select the plurality of bands from the group of P bands and the plurality of bands contains fewer bands than the group of P bands.

33. The method as recited in claim 1, wherein the individual is allowed to select the plurality of bands from a group of P bands and the plurality of bands contains fewer bands than the group of P bands.

34. The method as recited in claim 33, wherein the plurality of bands consists of a first and a second band.

35. The method as recited in claim 34, wherein the candidate finger and the BFST match are determined to match if the match index is equal to or greater than 0.5.

36. The method as recited in claim 33, wherein the group of P bands is spaced from a starting point determined by the reference barrier.

37. The method as recited in claim 36, wherein the plurality of bands are a subset of a full fingerprint and are not sufficient to identify the full fingerprint using conventional fingerprint analysis in the absence of the full fingerprint.

38. The method as recited in claim 36, wherein the plurality of bands are a subset of a full fingerprint and are sufficient to identify the full fingerprint using conventional fingerprint analysis in the absence of the full fingerprint.

39. The method as recited in claim 1, wherein the plurality of bands substantially comprise a full fingerprint.

40. The method as recited in claim 1, wherein the plurality of candidate tracks are derived from linear signatures obtained from a detector output of an optical source/detector setup in the authentication unit.

41. The method as recited in claim 40, wherein the linear signatures are obtained by swiping a finger across at least one orifice of the optical source/detector setup.

42. The method as recited in claim 41, wherein the optical source/detector setup uses a total internal reflection optical arrangement for an impinging and reflected light at the orifice.

43. The method as recited in claim 42, wherein the optical source/detector setup includes an optically transparent plate located at the orifice over which the finger is swiped.

44. The authentication unit of claim 43, wherein the optically transparent plate is comprised of sapphire.

45. The authentication unit of claim 43, wherein the optically transparent plate has a refractive index for 650 nm light not less than 1.768.

46. The authentication unit of claim 43, wherein the optically transparent plate is comprised of SF11 glass.

47. The method as recited in claim 1, wherein each of the plurality of candidate tracks is obtained by swiping a finger across a separate orifice of a separate optical source/detector setup that captures a linear signature from which a separate track is obtained.

48. The method as recited in claim 47, wherein each optical source/detector setup includes an optically transparent plate located at its separate orifice over which the finger is swiped and uses a total internal reflection optical arrangement for an impinging and reflected light at its separate orifice.

49. The authentication unit of claim 48, wherein the optically transparent plate is comprised of sapphire.

50. The method as recited in claim 49, wherein a full fingerprint of the selected finger can be divided into a group of P bands where P is an integer of 2 or more and there is no spacing between adjacent bands within the group, each band being comprised of a group of ten or more regularly spaced tracks separated by d mm bunched together as a record, the trackwidth of each of the tracks being between approximately a few microns to a few thousandths of an inch.

51. The authentication unit of claim 48, wherein the optically transparent plate has a refractive index for 650 nm light not less than 1.768.

52. The authentication unit of claim 48, wherein the optically transparent plate is comprised of SF11 glass.

53. The method as recited in claim 1, wherein the BFST is obtained from a stored file containing a fingerprint image by spatially orienting and scaling the fingerprint image to be compatible with both the directional orientation and dimensional scale of the enrollment frame so as to determine the first and the second band within the stored file.

54. The method as recited in claim 1, wherein each maximum similarity index obtained for each of the plurality of tracks is multiplied to calculate a match index which is used to determine whether the individual is authenticated.

55. A method for authenticating an individual by use of fingerprint data, comprising:
obtaining a biometrics fingerprint signature template ("BFST") for the individual in an enrollment process by the following steps:
selecting a first and a second band for the BFST;
obtaining a first plurality of tracks for the first band and a second plurality of tracks for the second band by use of an enrollment frame of a selected finger of the individual, wherein the first and second bands are spatially referenced to the enrollment frame and can be spatially referenced to a reference barrier and two or more fiducial marks are used for calibration in obtaining the enrollment frame; and
determining whether there is a match between a candidate finger and the BFST in an authentication process by the following steps:
selecting a swipe direction and an access code for the individual;
obtaining a first and a second candidate track from the candidate finger through use of the reference barrier in an authentication unit so that the first candidate track is spatially referenced so as to be within the first band and the second candidate track is spatially referenced so as to be within the second band;
calculating a first authentication similarity index from the first candidate track and the first plurality of tracks by use of a Fast Fourier-transform fingerprint algorithm;
calculating a second authentication similarity index from the second candidate track and the second plurality of tracks by use of the Fast Fourier-transform fingerprint algorithm; and
using the first authentication index and the second authentication index to determine if the candidate finger and the BFST match.

56. The method as recited in claim 55, wherein each track of the first and second plurality of tracks and the first and second candidate tracks are obtained from a linear signature.

57. The method as recited in claim 55, wherein each track of the first and second plurality of tracks and the first and second candidate tracks is digitally formatted from a straight line horizontal ridge-valley contour of a fingerprint.

58. The method as recited in claim 57, wherein each track of the first and second plurality of tracks and the first and second candidate tracks is configured as N pixels each pixel having a numerical value, wherein N is equal to $2^M$.

59. The method as recited in claim 58, wherein M is set equal to 8 and N is 256.

60. The method as recited in claim 55, wherein the individual is allowed to select the first and second bands from a group of bands.

61. The method as recited in claim 60, wherein the first and the second band are separated by a fixed distance.

62. The method as recited in claim 55, wherein the first candidate track is derived from a first linear signature obtained from a first detector output of a first optical source/detector setup in the authentication unit and the second candidate track is derived from a second linear signature obtained from a second detector output of a second optical source/detector setup in the authentication unit.

63. The method as recited in claim 62, wherein the first linear signature is obtained by swiping a finger across a first orifice of the first optical source/detector setup and the second linear signature is obtained by swiping the finger across a second orifice of the second optical source/detector setup.

64. The method as recited in claim 63, wherein the first and the second optical source/detector setups use a total internal reflection optical arrangement for an impinging and reflected light at the first and second orifices.

65. The method as recited in claim 63, wherein the first and the second orifices are separated from each other by a distance corresponding to a band separation between the first and the second bands.

66. The method as recited in claim 63, wherein the first and the second orifices are movable relative to each other and the reference barrier.

67. The method as recited in claim 62, wherein the first optical source/detector setup includes a first optically transparent plate located at the first orifice over which the finger is swiped and the second optical source/detector setup includes a second optically transparent plate located at the second orifice over which the finger is swiped.

68. The method as recited in claim 67, wherein the first and the second orifices are a fixed distance apart from each other but movable relative to the reference barrier.

69. The method as recited in claim 55, wherein the BFST is obtained from an enrollment unit in which the enrollment frame is determined by use of physical boundaries of an area for obtaining a fingerprint image of the individual, wherein the physical boundaries are comprised of:
- an enrollment unit reference barrier that aligns the finger in a North-South orientation within the reference frame; and
- two side limiters used to align the finger in a West-East direction wherein the movement in either the East or the West direction from a North-South centerline running through the first and the second orifice is substantially the same.

70. The method as recited in claim 55, comprising the further steps of:
- calculating a match index by multiplying the maximum value obtained for the first authentication similarity index by the maximum value obtained for the second authentication similarity index; and
- using the match index to determine whether the individual is authenticated.

71. The method as recited in claim 70, wherein the candidate finger and the BFST are determined to match if the match index is equal to or greater than 0.5.

72. An authentication process for authenticating an individual by use of fingerprint data from a selected finger of the individual, comprising the steps of:
(1) swiping the finger one or more times across a swipe surface of an authentication unit in accordance with preselected swipe limits to obtain a plurality of candidate linear signatures that are spatially referenced to a reference barrier so that each of the plurality of candidate linear signatures is spatially referenced so as to be within a corresponding band of a plurality of bands;
(2) converting each of the plurality of linear signatures to a candidate track;
(3) calculating an authentication similarity index for each candidate track and each of a plurality of tracks for its corresponding band from a selected biometrics fingerprint signature template ("BFST") by use of a Fast Fourier-transform fingerprint algorithm;
(4) calculating a match index by multiplying the maximum value obtained for the authentication similarity index for each candidate track; and
(5) using the match index to determine whether the individual is authenticated for the selected BFST.

73. The authentication process as recited in claim 72, wherein the plurality of candidate linear signatures is comprised of a group of two linear signatures.

74. The authentication process as recited in claim 73, wherein the individual is authenticated if the match index is equal to or greater than 0.5.

75. The authentication process as recited in claim 73, comprising the additional steps of:
(6) repeating steps (3) through (5) for one or more additional BFST in a plurality of BFST.

76. The authentication process as recited in claim 75, wherein the individual is authenticated for a given BFST if the match index for that given BFST is equal to or greater than 0.5.

77. The authentication process as recited in claim 75, wherein step (6) is stopped once the match index for a given BFST exceeds a preselected threshold.

78. The authentication process as recited in claim 77, wherein the preselected threshold is equal to or greater than 0.5.

79. The authentication process as recited in claim 75, wherein step (6) is repeated for every BFST in the plurality of BFST and the individual is authenticated for a BFST in the plurality of BFST that has the highest match index equal to or greater than 0.5.

80. The authentication process as recited in claim 73, wherein a full fingerprint of the selected finger can be divided into a group of P bands, where P is an integer of 2 or more, and there is no spacing between adjacent bands within the group.

81. The authentication process as recited in claim 80, wherein the plurality of bands are a subset of a full fingerprint and are not sufficient to identify the full fingerprint using conventional fingerprint analysis in the absence of the full fingerprint.

82. The authentication process as recited in claim 80, wherein the plurality of bands are a subset of a full fingerprint and are sufficient to identify the full fingerprint using conventional fingerprint analysis in the absence of the full fingerprint.

83. The authentication process as recited in claim 82, wherein the plurality of bands substantially comprise a full fingerprint.

84. The authentication process as recited in claim 83, wherein a positive identification of a full fingerprint is obtained for one of the plurality of BFST when the match index exceeds a positive identification threshold.

* * * * *